(12) United States Patent
Hammonds

(10) Patent No.: US 7,066,353 B2
(45) Date of Patent: Jun. 27, 2006

(54) FLUID POWERED ADDITIVE INJECTION SYSTEM

(76) Inventor: Carl L. Hammonds, 7358 Pine Hollow Dr., Humble, TX (US) 77395

( * ) Notice: Subject to any disclaimer, the term of this patent is extended or adjusted under 35 U.S.C. 154(b) by 413 days.

(21) Appl. No.: 10/704,496

(22) Filed: Nov. 7, 2003

(65) Prior Publication Data

US 2004/0136832 A1 Jul. 15, 2004

Related U.S. Application Data

(60) Provisional application No. 60/425,108, filed on Nov. 7, 2002.

(51) Int. Cl.
*B67D 5/08* (2006.01)

(52) U.S. Cl. .............. 222/63; 222/1; 222/57; 222/71

(58) Field of Classification Search .......... 222/52, 222/61, 63, 333–334, 1, 14, 26, 385, 386.5, 222/394–395, 57, 71, 135, 318, 109, 16; 137/624.13, 624.15; 700/231, 241; 417/43, 417/408–409

See application file for complete search history.

(56) References Cited

U.S. PATENT DOCUMENTS

| | | | |
|---|---|---|---|
| 4,008,829 A | 2/1977 | Chandra et al. | |
| 4,119,113 A | 10/1978 | Meginniss, III | |
| 4,370,996 A | 2/1983 | Williams | |
| 4,452,573 A | 6/1984 | Samuel | |
| 4,509,903 A | 4/1985 | Fram | |
| 4,632,085 A | 12/1986 | Misawa et al. | |
| 4,955,943 A | 9/1990 | Hensel et al. | |
| 5,004,155 A | 4/1991 | Dashevsky | |
| 5,218,988 A | 6/1993 | McNamara et al. | |
| 5,251,785 A * | 10/1993 | Hayden et al. | 222/1 |
| 5,271,526 A * | 12/1993 | Williams | 222/16 |
| 5,344,044 A * | 9/1994 | Hayden et al. | 222/1 |
| 5,727,933 A | 3/1998 | Laskaris et al. | |
| 5,992,473 A * | 11/1999 | Hammonds | 141/9 |
| 6,135,719 A | 10/2000 | Yoder et al. | |
| 6,208,913 B1 | 3/2001 | Marshall et al. | |
| 6,454,540 B1 | 9/2002 | Terefinko et al. | |

* cited by examiner

*Primary Examiner*—Frederick C. Nicolas
(74) *Attorney, Agent, or Firm*—Gary L. Bush, Esq.; Andrews Kurth LLP

(57) ABSTRACT

An apparatus and method for proportionally injecting a liquid chemical into a fluid stream using a portion of the fluid stream as motive force for a chemical injection pump. The apparatus includes a paired single or double acting reciprocating injection pump and driver with the driver piston(s) having a surface area of three times the surface area of the injection piston(s). The portion of the fluid stream is passed through a prime mover to the pump and then discharged to atmosphere. A fluid product flow meter generates a signal which controls the cycling of the reciprocating pump.

20 Claims, 3 Drawing Sheets

FLUID POWERED ADDITIVE INJECTION SYSTEM

CROSS REFERENCE TO RELATED APPLICATION

This application is based upon provisional application 60/425,108 filed on Nov. 7, 2002, the priority of which is claimed.

BACKGROUND OF THE INVENTION

1. Field of the Invention

This invention relates generally to the field of additive pumps that inject a chemical additive such as a dye, de-icing agent, detergent or the like into a liquid flow stream and specifically to a method and apparatus for powering an additive metering pump from the pressure head of said liquid flow stream and controlling it for proportionality.

2. Description of the Prior Art

A popular means of injecting chemical additives into various liquid streams, particularly fuels, is to use a signal generated from a flow meter in the recipient line to control a chemical injection pump. Most flow meters used for this purpose generate a discrete pulse as a given volume of fluid has flowed through the meter as opposed to providing a continuous signal whose amplitude is proportional to flow at a given instant. That is, each pulse from the product meter represents a fixed amount of product passing through the system. The pulse rate is used to pace various types of injection pumps capable of delivering the appropriate amount of additive for each pulse at sufficient pressure. This method is called pulse triggering.

The market contains many electric-powered metering pumps capable of pulse triggering from an external flow meter. However, for use with flammable fuels and around potentially explosive atmospheres, the injection system often uses a pneumatically-powered injection pump. Such a system is described in U.S. Pat. No. 4,370,996 to Williams. The use of compressed air may be disadvantageous because the air may contain moisture which is subject to freezing in cold climates. In addition, air operated components require some degree of lubrication in order to operate dependably.

Another alternative is to use a hydraulically-powered metering pump with control system such as disclosed in U.S. Pat. No. 6,135,719 to Yoder et al. This method has inherent overhead in requiring a dedicated hydraulic fluid system with head tank, pump, piping and associated components.

It is advantageous to use the solvent fluid to which the additive is to be injected as the hydraulic power for the injection pump, because it eliminates the overhead and complexity of an independent powering hydraulic system. This concept is commonly embodied in the prior art as inline venturi injectors.

In another embodiment of solvent fluid-powered injection systems, U.S. Pat. No. 4,119,113 to Meginniss teaches using a master-slave piston pump, wherein the master or driving piston is actuated by the solvent fluid flow and drives the slave or injection piston to add the chemical to the solvent flow downstream of the master piston. The '113 system is designed so that all of the solvent flow must pass through the master piston for metering purposes, limiting the maximum solvent flow rate and subjecting solvent flow to significant pressure drops and oscillations. Further, the system is confined to a fixed ratio dependant on the geometric design and arrangement of the master-slave piston pump. Because the injection ration is geometrically fixed, it is not easily adaptable for a variety of systems.

3. Identification of Objects of the Invention

A primary object of the invention is to provide a positive-displacement proportional chemical injection system, wherein the additive pump is powered by a pressure differential in the solvent line.

Another object of the invention is to provide a positive-displacement proportional chemical injection system having a widely adjustable mixing ratio.

Another object of the invention is to provide a positive-displacement proportional chemical injection system having a simplified open loop control based on solvent flow.

Another object of the invention is to provide a positive-displacement proportional chemical injection system having an injection pump immersed in the chemical additive to minimize introduction of air into the system.

Another object of the invention is to provide a positive-displacement proportional chemical injection system wherein the ratio adjustment is easily made by a user of the system.

SUMMARY OF THE INVENTION

The objects identified above as well as other features and advantages of the invention are incorporated in an apparatus for a chemical injection system which utilizes the dynamic pressure and a portion of the solvent fluid product (to which an additive is to be injected) to power an hydraulic prime mover which is mechanically coupled to an injection pump. The portion of solvent fluid which powers the hydraulic prime mover discharges to a low pressure region, preferably to the solvent storage tank vented to atmosphere or alternatively to the inlet of a product pump which is pressurizing the system. A control valve controls the flow of fluid to the hydraulic prime mover based on input from a flow meter in the delivery line of the system. A control system takes input pulses from the flow meter and converts them to a signal appropriate for actuating the control valve to achieve an injection rate proportional system flow.

A flow restrictor or throttle valve is located adjacent the control valve to limit the energy of the fluid flowing to the hydraulic prime mover, resulting in slower prime mover speed.

The metering pump is optimally immersed in the chemical additive to minimize introduction of air into the system. A check valve located at the output of the metering pump prohibits flow reversing through the metering pump when the pump is idle or between pump cycles.

Both the injection pump and the powering cylinder that operates the pump may be reciprocating; they can be either single or double acting. A single acting pump is powered by hydraulic pressure during the discharge stroke and utilizes a spring to reset the pump during the suction stroke. A double acting pump is hydraulically powered during both the discharge and suction cycles. Alternatively, the metering pump may be driven by a hydraulic motor and gear assembly.

By choosing the appropriate cylinder diameters and stroke lengths of the pump and powering cylinder, the pump is capable of delivering the required ratio of additive at system pressure. The ratio may be adjusted by a stroke adjustment on the reciprocating pump and/or by digital logic in the controller. For example, the ratio produced by a pump of a given geometrical configuration at full stroke operating at each flow meter pulse may be reduced to twenty-five percent by limiting the stroke length to one-half the maximum and stroking only on every other flow meter pulse.

BRIEF DESCRIPTION OF THE DRAWINGS

The invention is described in detail hereinafter on the basis of the embodiments represented schematically in the accompanying figures, in which.

DESCRIPTION OF THE PREFERRED EMBODIMENT OF THE INVENTION

Figure 1:
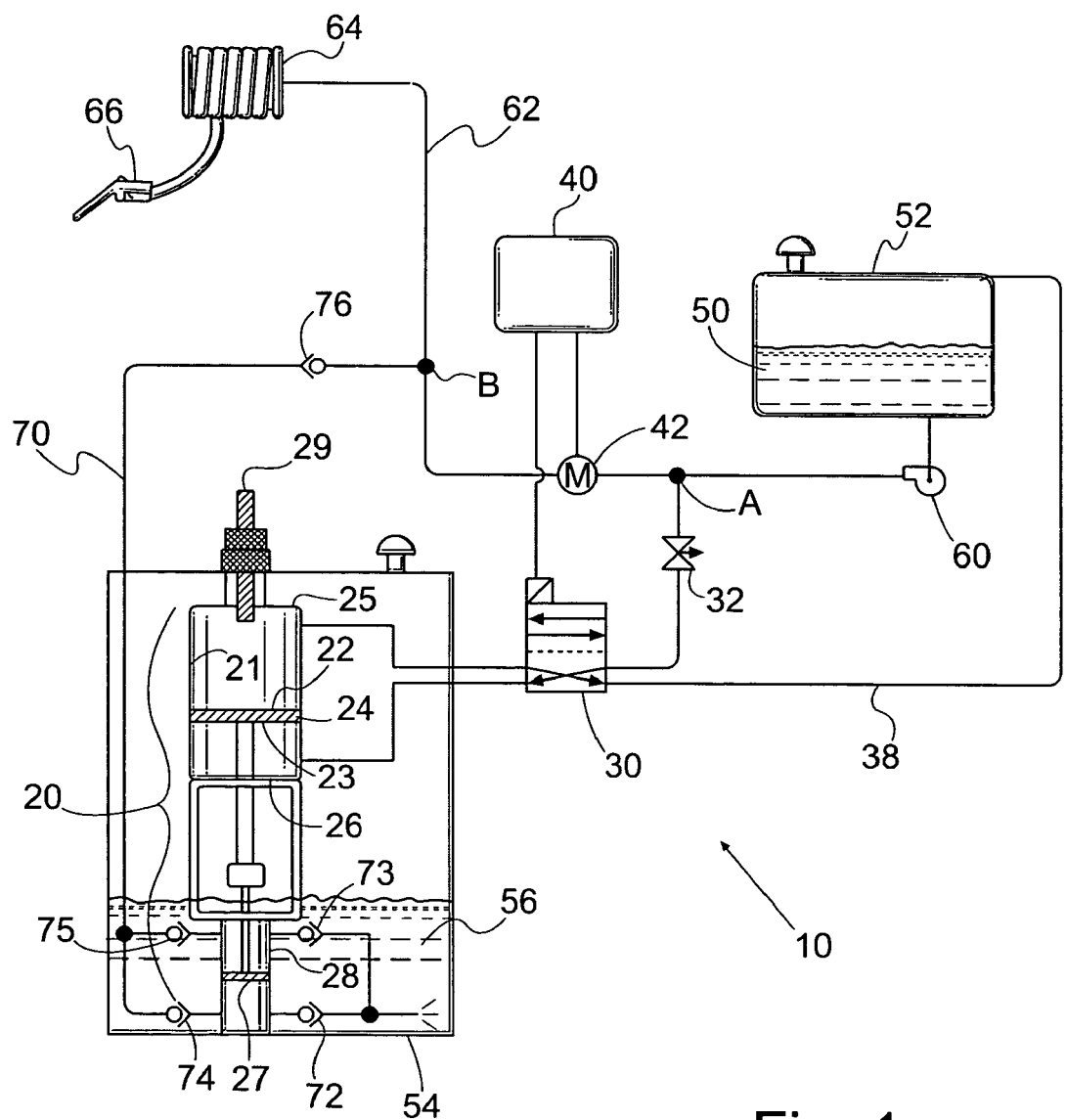
FIG. 1 illustrates a typical fluid powered system utilizing a reciprocating master-slave piston/cylinder arrangement and a four-port flow-reversing control valve.

As illustrated in FIG. 1, the additive injection system 10 according to the invention comprises a master-slave piston pump arrangement 20, an electrically actuated control valve 30 for porting fluid to reciprocate the piston pump, and a controller 40 with a flow meter 42 which together operate the control valve 30 at a rate based on flow in the system to which the chemicals are to be added. The piston pump arrangement includes a power cylinder 21 with master piston 24 attached to a smaller injection cylinder 28 with plunger 27. The master piston 24 is dynamically sealed with the power cylinder 21, and the injection plunger is dynamically sealed within the injection cylinder 28.

The master-slave piston pump 20 is designed and arranged to be immersed in the chemical additive 56 within the chemical addition storage tank 54. Although not necessary, it is advantageous for master-slave pump 20 to be located in tank 54 because immersion reduces the likelihood of air being induced into the system.

FIG. 1 shows solvent fluid 50 being stored in tank 52, which is vented to atmosphere. Product pump 60 receives fluid 50 from tank 52 and raises the pressure for delivery through delivery line 62. The product pump 60 may be any suitable pump for the application such as single stage centrifugal, multistage centrifugal, positive displacement, etc. For example, for deicing or fire fighting foam application, solvent 50 is delivered at between 40–150 psi to hose 64 and nozzle 66 using a centrifugal pump 60.

The solvent fluid 50 passes through flow meter 42, which generates a pulse at pre-determined intervals such as 5 or 10-gallon increments. Meter pulses are processed by the controller 40, which processes the pulses through the use of a programmable logic controller (PLC). An output pulse signal generated at appropriate intervals is then passed to the control valve 30. The controller 40 may be set to output a user-defined fraction of meter pulses for a reduced injection ratio.

Control valve 30 is an electrically actuated 4-way control valve with straight-through and cross-over flow positions. The control valve 30 receives pressurized solvent fluid 50 downstream of product pump 60 and upstream of flow meter 42, defined as point A. The fluid 50 passes through throttle valve 32, the purpose of which is discussed below. The control valve 30 directs the pressurized fluid 50 to the power cylinder 21, which exerts force on a first side 22 of the master piston 24 forcing it from a first end 25 of power cylinder 4 towards a second end 26. Solvent fluid 50 on the opposite side 23 of the master piston 24 is passed through the return port in control valve 30, through the recirculation line 38, and back to solvent tank 52. At a point based on input from flow meter 42, controller 40 causes control valve 30 to change position. Pressurized fluid 50 is then directed to the opposite side 23 of master piston 24, forcing piston 24 to move toward the first end 25 of power cylinder 21. Thus, control valve 30 alternates the flow of fluid 50 to the power cylinder 21 (above and below the master piston 24), causing piston 24 to reverse direction at each pulse from controller 40. A pumping cycle is defined as one complete stoke of master piston 24 in a first direction followed by a complete stroke of master piston 24 in the opposite direction.

The master piston 24 of power cylinder 21 is mechanically linked to the injection plunger 27 of injection cylinder 28. Each stroke of master piston 24 causes the plunger 27 to move in the same direction. In the first half of a pumping cycle, the plunger 27 is moved in a first direction, drawing chemical in to the lower portion of injection cylinder 28 from chemical tank 54 through check valve 72 and discharging chemical residing in the upper portion of cylinder 28 through check valve 75, chemical addition line 70, and check valve 76 into the delivery line 62. In the second half of the pumping cycle, the plunger 27 reverses direction, expelling the chemical residing in the lower portion of injection cylinder 28, through check valve 74, chemical addition line 70, and check valve 76 into the delivery line 62 while drawing chemical from tank 54 though check valve 73 into the upper portion of cylinder 28. In other words, each pumping cycle delivers a corresponding amount of additive 56 under pressure to product delivery line 62 at point B, downstream of flow meter 42. Check valve 76 prevents fluid from migrating into the chemical injection line 70 when the master-slave pump 20 is not operating or between individual pumping cycles.

Because the master-slave pump assembly 20 is discharging chemical additive 56 into fluid 50 at essentially the same pressure as the fluid driving master piston 24, the powering cylinder 21 and master piston 24 must be larger in area than the injection cylinder 28 and the plunger 27 in order to provide enough force to operate the pump 20. As an example, the master piston 21 is usually sized at three times the area of the injection plunger area in order to be capable of delivering the additive. Regardless of the system pressure, the ratio of master piston 24 force to injection plunger 27 force is the same as the fixed geometrical ratio of master piston 24 area to injection plunger 27 area. Thus, pressure has no net effect on the overall performance of the system. A 3:1 master piston to injection plunger area ratio will always be capable of overcoming system pressure.

The system 10 as shown in FIG. 1 relies on a differential pressure across master piston 24 to operate the master-slave pump assembly 20. The high pressure source is solvent fluid 50 at the discharge head of product pump 60 less any pressure loss across piping, the throttle valve 32 and the control valve 30. The low pressure sink is provided by allowing the power cylinder 21 to discharge "spent" powering solvent fluid 50 to a low pressure region. Either the fluid supply tank 52 or the suction inlet to the product pump 60 may be used for the low pressure region. In the first case, routing the recirculation line 38 to the fluid supply tank 52 results in near atmospheric pressure at the low pressure side of master piston 24. In the later case, because the suction pressure of pump 60 depends on myriad system factors, the suction or inlet pressure may be slightly greater than, equal to or less than atmospheric pressure, but routing the recirculation line 38 to the inlet of pump 60 provides ample differential pressure for the master-slave piston pump 20.

The fluid 50 powering the master-slave piston pump 20 is not measured by flow meter 42. Thus, the fluid powering the master-slave pump does not erroneously richen the injection ratio of the fluid in delivery line 62.

The master-slave piston pump 20 is adjusted by means of a stroke limiting device 29 located outside the additive tank 54. The adjustment 29 makes it possible to set the output of the pump 20 from zero to one hundred percent of maximum stroke length. The system is calibrated by setting pump stroke necessary to delivery the desired amount of additive for each triggering pulse. Pump 20 speed is controlled by throttle valve 32 which limits the energy of fluid delivered to the power cylinder 21. In this manner, it is possible to time the delivery of each injection cycle, making injection smooth and continuous. When the master-slave pump is disposed in the chemical addition tank 54, the stroke adjustment control 29 protrudes through the top of the tank 54 for ease of adjustment.

By choosing the appropriate cylinder diameters and stroke lengths of master-slave pump assembly 20, the pump is capable of delivering a specified ratio of additive at system pressure. The ratio may be adjusted by a stroke adjustment on the reciprocating pump and/or by PLC logic in the controller 40. For example, the ratio produced by a pump of a specified geometrical configuration at full stroke operating at each flow meter 42 pulse may be reduced to twenty-five percent by limiting the stroke length to one-half the maximum and stroking only on every other flow meter pulse.

Figure 2:
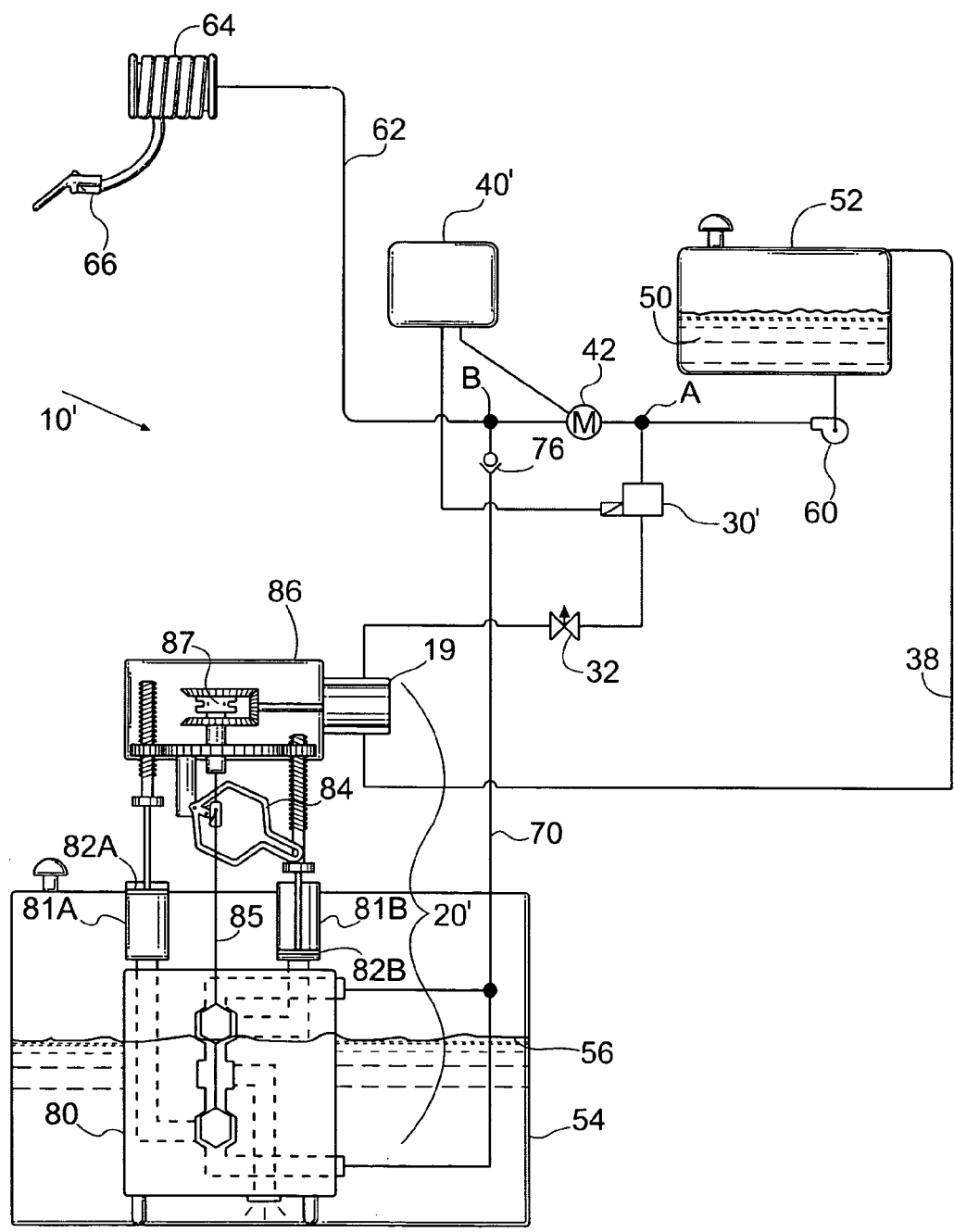
FIG. 2 shows a fluid powered system utilizing a dual reciprocating metering pump powered by a hydraulic motor and a two-port control valve.

FIG. 2 illustrates a system 10' similar to system 10 illustrated in FIG. 1, except the system in FIG. 2 uses a rotary hydraulic motor to power a dual reciprocating injection pump. System 10' includes a positive displacement reciprocating pump 20' which is driven by a hydraulic motor 19, an electrically actuated control valve 30' for proportionally controlling fluid flow to the hydraulic motor 19, and a controller 40' with a flow meter 42 which together operate the control valve 30' based on flow in the system. The reciprocating pump 20' is designed and arranged to be immersed in the chemical additive 56 within the chemical addition storage tank 54. It is not necessary for piston pump 20' to be located in tank 54, but it is advantageous, because immersion reduces the likelihood of air being induced into the system. The discharge port of metering pump 20' is coupled to chemical addition line 70 which in turn is coupled to delivery line 62 at point B by check valve 76.

One example of a suitable pump 20' and motor 19 arrangement is disclosed in U.S. Non-provisional application Ser. No. 10/676,184 by Carl L. Hammonds, filed on Oct. 1, 2003, which is incorporated herein by reference. Hammonds discloses a metering pump using two matching piston/cylinder arrangements wherein the first piston 82A always moves in an opposite direction to the movement of the second piston 82B. The pump 20' includes a gearbox arrangement 86 for reciprocating the two pistons 82A, 82B by a motor which rotates in only one direction. In this arrangement, the dual chamber pump 20' is driven by hydraulic motor 19. A mechanically actuated two-position 3-way valve assembly 80 is coupled to the dual piston/cylinder assemblies 82A, 82B to direct fluid flow with minimal valve seat leak-by. A direction reversing actuator 84 and a linkage 85 are driven by piston/cylinder assembly 82B and actuate the valve seats in valve block 80 and a clutch 87 in gear box 86 to reverse the direction of movement of pistons 82A, 82B when they have reached a limit of travel. As shown in FIG. 2, piston 82B has reached the lower limit of travel. The direction reversing actuator has changed position to cause linkage 85 to move from a lower to an upper position, seating valves in the valve block 80 and the clutch 87 to upper positions; the directions of movement of the pistons 82A, 82B are now reversed, with piston 82A beginning its descent in cylinder 81A and piston 82B beginning its ascent in cylinder 81B.

FIG. 2 shows that solvent fluid 50 is stored in tank 52, which is vented to atmosphere. Product pump 60 receives fluid 50 from tank 52 and raises the pressure for delivery through delivery line 62. The product pump 60 may be any suitable pump for the application such a single stage centrifugal, multistage centrifugal, positive displacement, etc. For example, for a deicing or fire fighting foam application, solvent 50 is delivered at between 40–150 psi to hose 64 and nozzle 66 using a centrifugal pump 60.

The solvent fluid 50 passes through flow meter 42 which generates a pulse at pre-determined intervals such as 5 or 10-gallon increments. Meter pulses are processed by the controller 40', which includes a PLC to compute injection rate from measured solvent flow rate and converts the PLC output signal to an appropriate analog voltage to position a pump control valve 30'. User adjustable circuitry allows the controller 40' to scale the output signal for controlling the injection ratio. In the system of FIG. 2, the injection ratio is set by a scale on the controller 40 or by throttling valve 32. Unlike the system 10 illustrated in FIG. 1, system 10' of FIG. 2 does not deliver a single measured volume of fluid for each pulse received from the meter. Instead, it operates continuously at a pre-determined rate based on input from the flow meter 42.

Control valve 30' is an electrically positioned throttle valve. The control valve 30' receives pressurized solvent fluid 50 downstream of product pump 60 and upstream of flow meter 42, defined as point A. The fluid 50 passes through throttle valve 32 which may be used to restrict maximum flow through motor 19 if desired. The powering fluid 50 then drives hydraulic motor 19 and is returned via recirculation line 38 to either tank 52 or the suction inlet of product pump 60. Motor 19 drives piston pump 20' which injects chemicals from tank 54, through check 76 and into product discharge line 62.

Like system 10 of FIG. 1, System 10' as shown in FIG. 2 relies on a differential pressure across hydraulic motor 19 to operate piston metering pump 20'. By discharging powering fluid 50 to the tank 52 or pump 60 inlet, the maximum differential pressure available across motor 19 is about the same as the discharge pressure of pump 60.

In a similar embodiment (not shown) which uses a hydraulic motor 19, the piston pump 20' is replaced with a positive displacement gear pump. The mechanical advantage needed to pump into system pressure is gained either by using a hydraulic motor having a greater displacement per revolution than the gear pump, by coupling the pump to the motor 19 with reduction gears, or a combination thereof.

Figure 3:
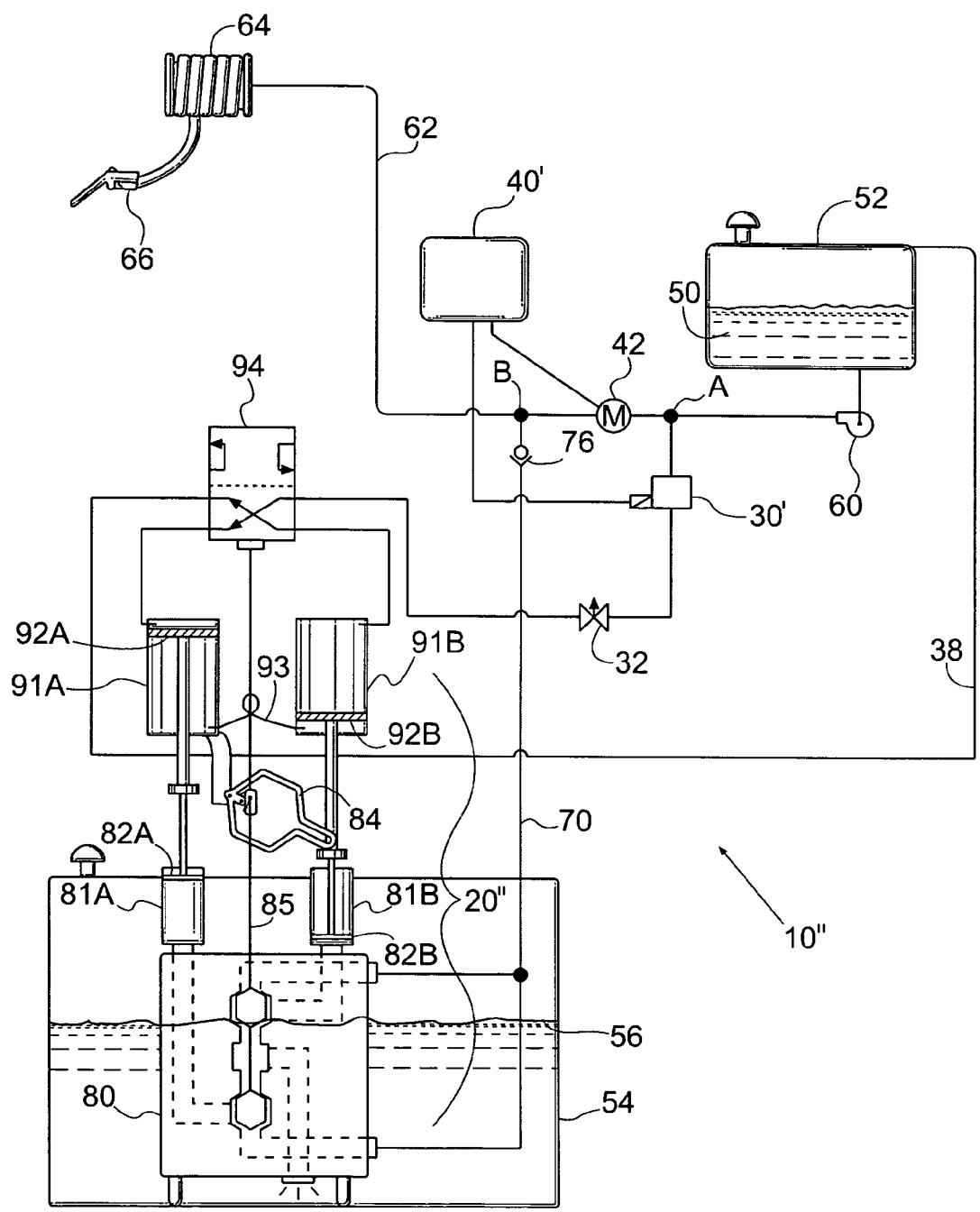
FIG. 3 shows a fluid powered system utilizing a dual reciprocating metering pump powered by a dual hydraulic piston/cylinder arrangement with a mechanically actuated four-port flow reversing valve and a two-port control valve.

FIG. 3 illustrates a system 10" which is similar to the system 10' as illustrated in FIG. 2. System 10" uses a variant of the pump 20' as disclosed by Hammonds in U.S. Non-provisional application Ser. No. 10/676,184, filed on Oct. 1, 2003, incorporated herein by reference. Instead of using hydraulic motor 19 and gearbox 86 to drive pistons 82A, 82B as shown in FIG. 2, two hydraulic power cylinders 91A, 911B with pistons 92A, 92B are used.

System 10" includes a positive displacement reciprocating pump 20" driven by pistons 92A, 92B, a mechanically actuated two-position four-port positioning valve 94, an electrically actuated control valve 30' for proportionally controlling fluid flow to the power cylinders 91A, 91B, and a controller 40' with a flow meter 42 which together operate the control valve 30' based on flow in the system. The reciprocating pump 20' is designed and arranged to be immersed in the chemical additive 56 within the chemical addition storage tank 54. It is not necessary for piston pump 20' to be located in tank 54, but it is advantageous because immersion reduces the likelihood of air being induced into the system. The discharge port of metering pump 20" is coupled to chemical addition line 70 which in turn is coupled to discharge line 62 at point B by check valve 76.

Metering pump 20" includes two matching piston/cylinder arrangements where the first piston 82A always moves in an opposite direction to the movement of the second piston 82B. The pump 20' includes power cylinders 91A, 91B, with pistons 92A, 92B connected to pistons 82A, 82B, respectively. The lower ends of cylinders 91A, 91B are fluidly coupled by line 93. The upper ends of cylinders 91A, 91B are fluidly coupled to two of the four ports of positioning valve 94. The remaining two ports of positioning valve 94 are coupled to the throttle valve 32 and recirculation line 38. A mechanically actuated two-position 3-way valve assembly 80 is coupled to the dual piston/cylinder assemblies 82A, 82B to direct fluid flow with minimal valve seat leak-by. A direction reversing actuator 84 and a linkage 85 are driven by piston/cylinder assembly 82B and actuate the valve seats in valve block 80 and the positioning valve 94 to reverse the direction of movement of pistons 82A, 82B when they have reached a limit of travel.

FIG. 3 shows solvent fluid 50 stored in a tank 52 which is vented to atmosphere. Product pump 60 receives fluid 50 from tank 52 and raises the pressure for delivery through delivery line 62. The product pump 60 may be any suitable pump for the application such a single stage centrifugal, multistage centrifugal, positive displacement, etc. For example, for deicing or fire fighting foam application, solvent 50 is delivered at between 40–150 psi to hose 64 and nozzle 66 using a centrifugal pump 60.

The solvent fluid 50 passes through flow meter 42, which generates a pulse at pre-determined intervals such as 5 or 10-gallon increments. Meter pulses are processed by the controller 40', which converts the signal to appropriate analog voltage to position the pump control valve 30'. User adjustable circuitry allows the controller 40' to scale the output signal for controlling the injection ratio.

Control valve 30' is an electrically positioned throttle valve. The control valve 30' receives pressurized solvent fluid 50 downstream of product pump 60 and upstream of flow meter 42, defined as point A. The fluid 50 passes through throttle valve 32 which can be used to restrict maximum flow through power pistons 92A, 92B if desired. The powering fluid 50 then drives hydraulic power pistons 92A, 92B and is returned via recirculation line 38 to either tank 52 or the suction inlet of product pump 60. Power pistons 92A, 92B drive piston pump 20" which injects chemicals from tank 54, through check 76 and into product discharge line 62.

As shown in FIG. 3, piston 82B has reached the lower limit of travel. The direction reversing actuator 84 has changed position to cause linkage 85 to move from a lower to an upper position, seating valves in the valve block 80 and the positioning valve 94 to upper positions. Pressurized powering fluid 50 now passes from the discharge of product pump 60, through control valve 30', through throttle valve 32, through positioning valve 94 in the upper crossover position, to the top of piston 92A in cylinder 91A. As piston 92A descends, fluid in cylinder 91A below piston 92A is expelled through line 93 into the bottom of cylinder 91B forcing piston 92B upwards. Fluid in cylinder 91B flows through positioning valve 94 and through recirculation line 38 back to tank 52. When piston 82B reaches its lower limit of travel, direction reversing actuator 84 changes position thereby lowering linkage 85 which moves both the positioning valve 94 and the valve seats in valve 80 to lower positions. The direction of powering fluid flow through positioning valve 94 and cylinders 91A, 91B is reversed thereby reversing the direction of movement of pistons 92A, 92B, 82A, and 82B.

Like system 10 of FIG. 2, System 10" as shown in FIG. 3 relies on differential pressure across hydraulic motor 19 to operate the piston metering pump 20'. By discharging powering fluid 50 to the tank 52 or pump 60 inlet, the maximum differential pressure available across motor 19 is about the same as the discharge pressure of pump 60.

In the system of FIG. 3, the injection ratio is set by a scale on the controller 40 and/or by throttling valve 32. Pump 20" operates continuously at a pre-determined rate based on input from flow meter 42.

The method of motive force using the solvent fluid to power the chemical metering pump may be utilized to power any type of fluid powered device including reciprocating and rotary motors, so long as it is possible to exhaust the powering fluid back to a low pressure region. A reciprocating pump may either be a single power cylinder, single or double acting, or may include dual pumping chambers which power dual, matched pumps alternating from suction to discharge.

While preferred embodiments of the invention have been illustrated in detail, it is apparent that modifications and adaptations of the preferred embodiments will occur to those skilled in the art. Such modifications and adaptations are in the spirit and scope of the invention as set forth in the following claims.

What is claimed is:

1. An injection system comprising,
   a source of pressurized fluid,
   a source of chemical additive (56),
   a delivery line (62) having an inlet fluidly coupled to said source of pressurized fluid and an outlet,
   a flow meter (42) fluidly coupled in said delivery line,
   a hydraulic prime mover (24, 19) fluidly coupled between a first point (A) of said delivery line upstream of said flow meter and a low pressure region (52),
   a metering pump (27, 28) mechanically coupled to said hydraulic prime mover (24, 19) and fluidly coupled between said source of chemical additive and a second point (B) of said delivery line downstream of said flow meter (42), and
   a control system (40, 30) coupled between said flow meter (42) and said prime mover (24, 19), said control system arranged and designed to control said prime mover as a function of the level of fluid flow measured by said flow meter (42).

2. The system of claim 1 wherein said source of pressurized fluid includes,
   a storage tank (52),
   a product pump (60) having an inlet fluidly coupled to said storage tank (52) and an outlet fluidly coupled to said inlet of said delivery line (62), and
   fluid (50) disposed in said storage tank.

3. The system of claim 2 wherein,
   said low pressure region is in said storage tank (50).

4. The system of claim 2 wherein,
said low pressure region is at atmospheric pressure.

5. An injection system comprising,
a source of pressurized fluid,
a source of chemical additive (56),
a delivery line (62) having an inlet fluidly coupled to said source of pressurized fluid and an outlet,
a flow meter (42) fluidly coupled in said delivery line,
a power take-off flow line fluidly coupled between a first point (A) of said delivery line upstream of said flow meter and a low pressure region,
a control valve (30) fluidly coupled in said power take-off flow line,
a hydraulic prime mover (24, 19) fluidly coupled with said power take-off flow line,
a metering pump (27, 80) mechanically coupled to said hydraulic prime mover and fluidly coupled between said source of chemical additive and a second point (B) of said delivery line downstream of said flow meter, and
a control system (40) coupled between said flow meter and said control valve (30), said control system arranged and designed to adjustably control said metering pump (27, 80) as a function of an amount of fluid flow through said flow meter.

6. The system of claim 5 further comprising,
a flow restrictor (32) fluidly coupled in said power take-off flow line.

7. The system of claim 5 wherein said source of pressurized fluid comprises,
a storage tank (52),
a product pump (60) having an inlet fluidly coupled to said storage tank, and
fluid disposed (50) in said storage tank.

8. The system of claim 7 wherein,
said low pressure region is said storage tank (52).

9. The system of claim 7 wherein,
said low pressure region is said inlet of said product pump (60).

10. The system of claim 5 wherein,
said metering pump is immersed in said source of chemical additive (52).

11. The system of claim 5 further comprising,
a check valve (76) fluidly coupled between said metering pump and said delivery line (62), said check valve designed and arranged to allow fluid flow from said metering pump to said delivery line and prevent fluid flow from said delivery line to said metering pump.

12. The system of claim 5 wherein,
said control system includes a programmable logic controller designed and arranged to process signals from said flow meter (24).

13. The system of claim 5 wherein,
said metering pump is a single reciprocating piston pump,
said hydraulic prime mover is a reciprocating piston engine, and
said control valve is a four port valve (30) having straight-through flow and cross-over flow positions to alternate direction of fluid flow through said hydraulic prime mover.

14. The system of claim 13 wherein,
said hydraulic prime mover has a cylinder (21) with an interior cross-sectional area that is generally at least three times an interior cross-sectional area of a cylinder (28) in said metering pump.

15. The system of claim 13 wherein said metering pump comprises,
a stroke adjustment device (29) designed and arranged to limit the longitudinal travel of a piston (24) in said reciprocating piston engine.

16. The system of claim 13 wherein,
said metering pump includes an injection cylinder (28), an inlet check valve (72) coupled to said injection cylinder and designed and arranged to allow fluid flow only into said injection cylinder, an outlet check valve (74) coupled to said injection cylinder and designed and arranged to allow fluid flow only out of said injection cylinder, and a plunger (27) designed and arranged to slideably seal inside said injection cylinder,
said hydraulic prime mover comprises a power cylinder (21) coaxially disposed near said injection cylinder and a master piston (24) designed and arranged to slideably seal in said power cylinder, said master piston mechanically coupled to said plunger, said power cylinder having a first port disposed near a first longitudinal end (25) of said power cylinder and fluidly coupled to a first control port of said control valve (30), said power cylinder having a second port disposed near a second longitudinal end (26) of said power cylinder and fluidly coupled to a second control port of said control valve, and
said control valve comprises an inlet port fluidly coupled to said source of pressurized fluid, an outlet port fluidly coupled to said low pressure region, a first flow position characterized by said inlet port being fluidly coupled to said first control port and said outlet port being fluidly coupled to said second control port, and a second flow position characterized by said inlet port being fluidly coupled to said second control port and said outlet port being fluidly coupled to said first control port.

17. The system of claim 5 wherein,
said metering pump is a dual reciprocating piston pump.

18. The system of claim 17 wherein,
said prime mover is a hydraulic motor (19).

19. The system of claim 17 wherein,
said prime mover is dual reciprocating piston engine.

20. A method of injecting a chemical additive in proportion to a flow rate of a pressurized flowline comprising the steps of,
diverting a portion of flow at a first point (A) in said flowline to create a diverted flow portion power a hydraulic prime mover, and exhausting said diverted flow portion to a low pressure region,
measuring a remainder of flow at a second point that is downstream of said first point to create a measurement of said flow, in said flowline,
controlling said diverted flow portion in a predetermined proportion to said measurement of said remainder of flow to control the motion of said hydraulic prime mover,
coupling said hydraulic prime mover to a metering pump,
fluidly coupling an input of said metering pump to a source of chemical additive, and
fluidly coupling an output of said metering pump to a third point (B) in said flow line, said third point disposed downstream of said second point.

* * * * *